United States Patent
Zemberry

[15] 3,672,708
[45] June 27, 1972

[54] COUPLING DEVICE

[72] Inventor: William L. Zemberry, Swissvale Borough, Pa.

[73] Assignee: United States Steel Corporation

[22] Filed: June 29, 1970

[21] Appl. No.: 50,622

[52] U.S. Cl. ............................................. 285/315, 287/119
[51] Int. Cl. ........................................................ F16l 37/18
[58] Field of Search ............... 285/321, 308, 319, 315, 316, 285/DIG. 22; 287/119, 53 H; 85/8.8

[56] References Cited

UNITED STATES PATENTS

| | | | |
|---|---|---|---|
| 3,447,819 | 6/1969 | Borsum et al. | 285/315 X |
| 3,389,923 | 6/1968 | Love, Jr. et al. | 85/8.8 X |
| 2,496,700 | 2/1950 | Cole | 287/53 H UX |
| 2,767,990 | 10/1956 | Jewell, Jr. | 287/119 R X |
| 1,587,079 | 6/1926 | Machino | 285/308 X |

FOREIGN PATENTS OR APPLICATIONS

| | | | |
|---|---|---|---|
| 692,526 | 8/1964 | Canada | 285/308 |
| 1,407,875 | 6/1965 | France | 285/321 |

Primary Examiner—Andrew V. Kundrat
Attorney—Robert J. Leek, Jr.

[57] ABSTRACT

A coupling device is disclosed for connecting one end of a pipe with a coupling member. The pipe is provided with pipe grooves adjacent said one end. The coupling member is provided with a coupling groove. A lock sleeve has a pipe groove tab and a coupling groove tab and is insertable into the coupling member so that the coupling groove tab locks in the coupling groove and is disposable on the one end of the pipe so that the pipe groove tab locks in the pipe groove thereby securing the coupling member to the one end of the pipe.

13 Claims, 18 Drawing Figures

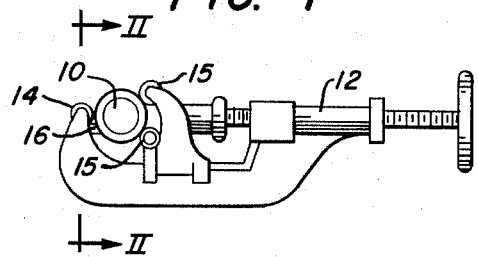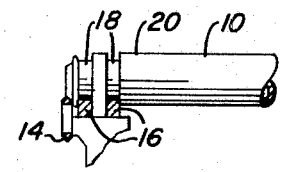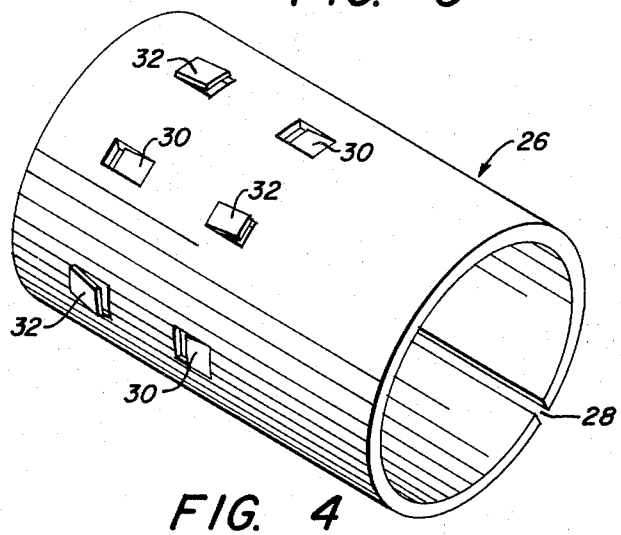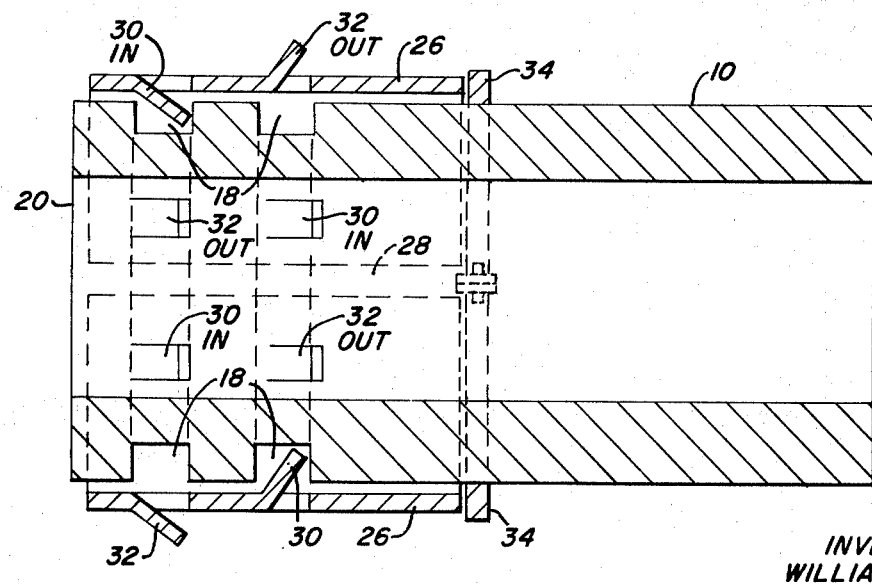

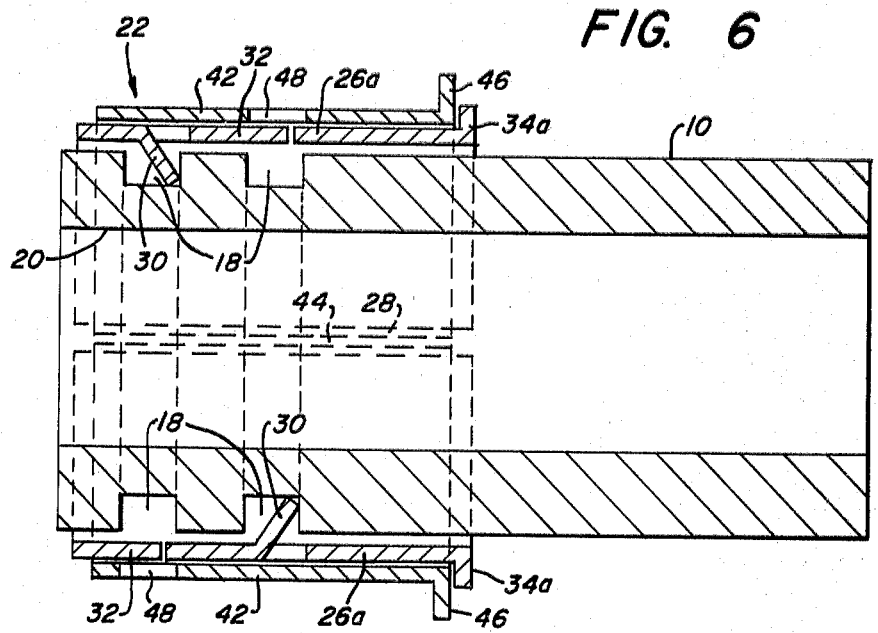
FIG. 6
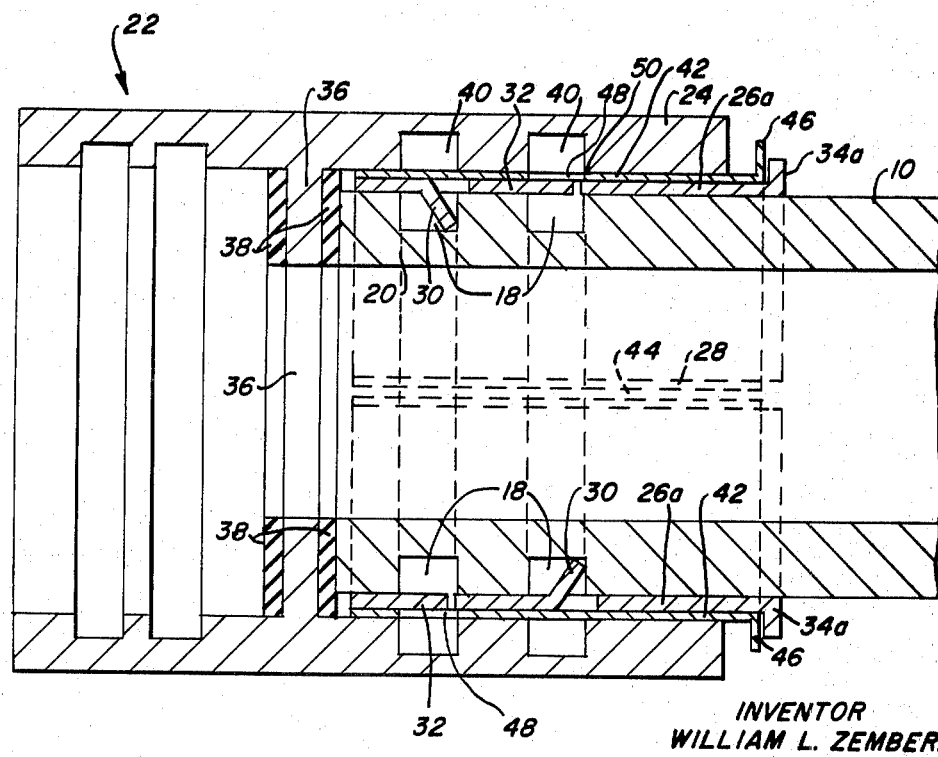
FIG. 7
INVENTOR
WILLIAM L. ZEMBERRY
By 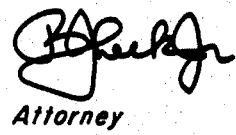
Attorney

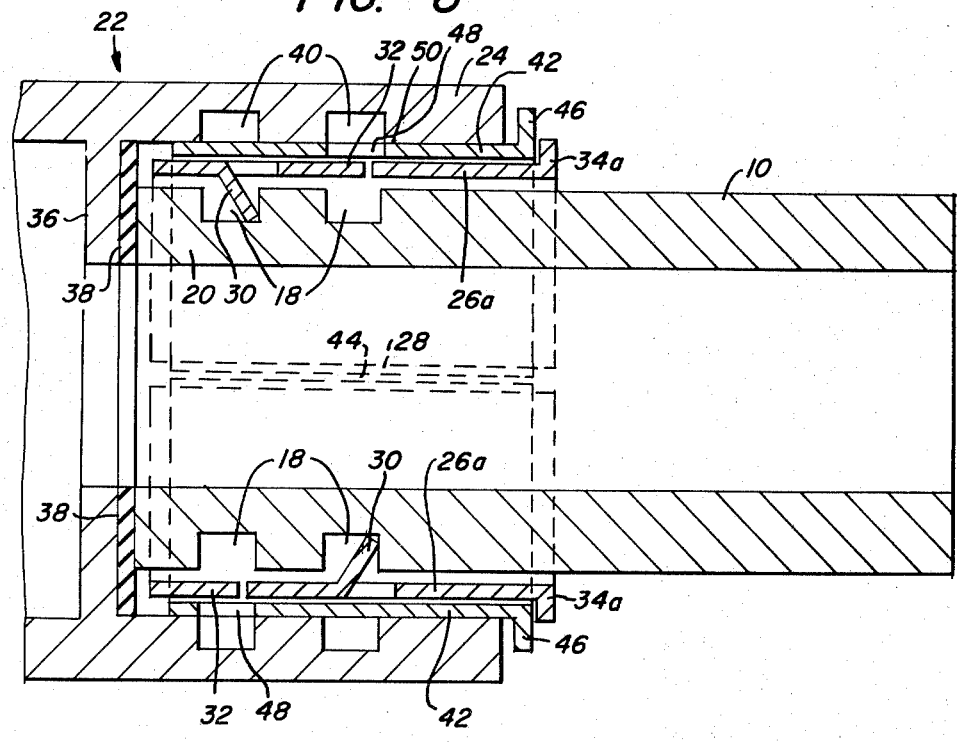
FIG. 8
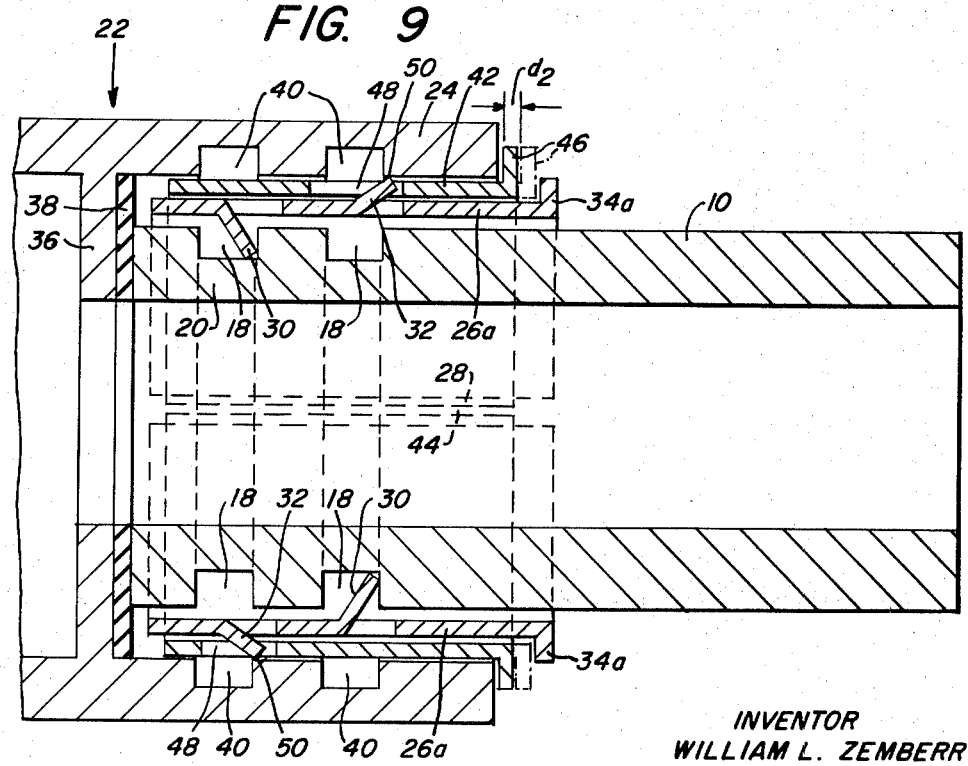
FIG. 9
INVENTOR
WILLIAM L. ZEMBERRY
By
Attorney

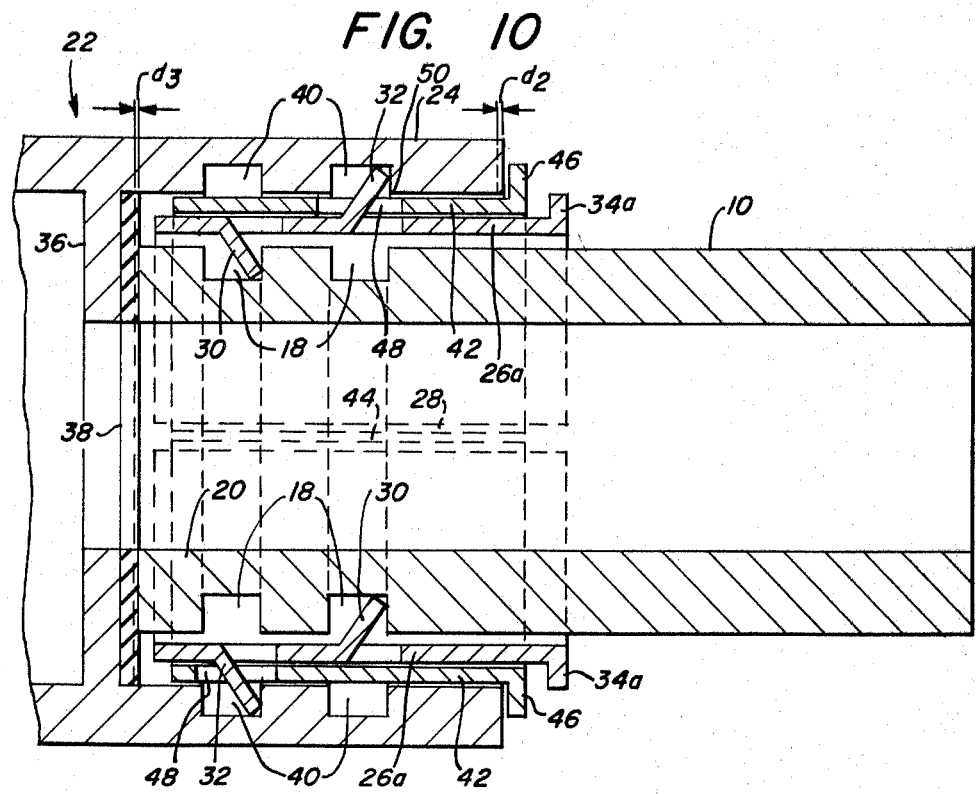
FIG. 10
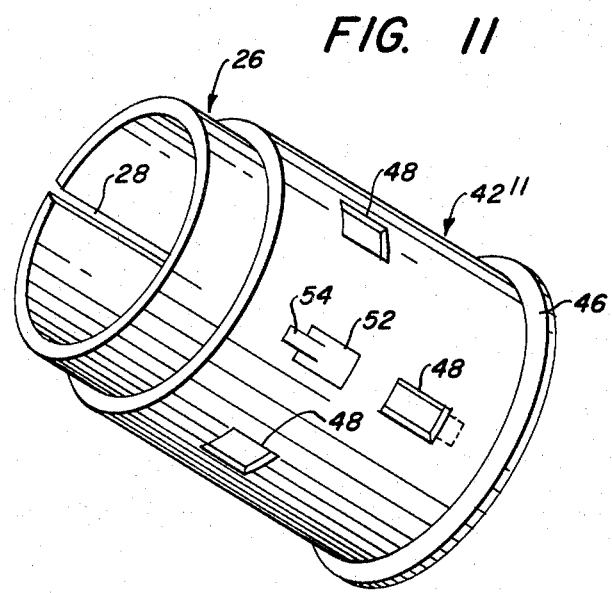
FIG. 11
INVENTOR
WILLIAM L. ZEMBERRY
Attorney

COUPLING DEVICE

BACKGROUND OF THE INVENTION

Heretofore, quick-make-and-disconnect couplings have been composed of two separate parts, a part being fastened to each of the two pipe ends to be joined. The mating parts of the coupling are joined through some matching configuration existing therebetween. Such couplings are expensive since they must be joined to the pipe by some elaborate method such as threading, clamping, or twist-locking.

Conventional coupling devices are shown in the following U.S. Patents:

| U.S. Patent No. | Inventor | Issued |
| --- | --- | --- |
| 1,256,556 | Hedges | 2/19/18 |
| 1,587,089 | Machino | 6/1/26 |
| 2,479,960 | Osborn | 8/23/49 |

OBJECTS OF THE INVENTION

It is the general object of this invention to avoid and overcome the foregoing and other difficulties of and objections to prior art practices by the provision of an improved coupling device which:

a. is simple and rugged in construction;
b. is inexpensive;
c. eliminates the conventional male connector by utilizing the end of the pipe itself;
d. provides a one-piece female connector;
e. provides a hermetic seal between the pipe ends being joined;
f. eliminates conventional clutch jaws and retainer rings for holding such clutch jaws;
g. is adapted to cover a wide range of pipe sizes;
h. cannot be accidentally disengaged by pushing; and
i. uses only one row of inwardly projecting tabs.

BRIEF SUMMARY OF THE INVENTION

The aforesaid objects of this invention and other objects which will become apparent as the description proceeds are achieved by providing an improved coupling device for coupling one end of a pipe to a coupling member and a method of coupling the one end of the pipe to the coupling member. The pipe is provided with pipe grooves adjacent said one end. The coupling member is provided with a coupling groove. A lock sleeve has a pipe groove tab and a coupling groove tab and is insertable into the coupling member so that the coupling groove tab locks in the coupling groove and is disposable on the one end of the pipe so that the pipe groove tab locks in the pipe groove thereby securing the coupling member to the one end of the pipe.

BRIEF DESCRIPTION OF THE SEVERAL VIEWS OF THE DRAWINGS

For a better understanding of this invention, reference should be had to the accompanying drawings wherein like numerals of reference indicate similar parts throughout the several views and wherein:

FIG. 1 is a side elevational view of the pipe and pipe cutting device for cutting the pipe to length;

FIG. 2 is a side elevational view taken from the right side of FIG. 1 along the line 2—2 of FIG. 1 in the direction of the arrows and showing the pipe cutting tool and a pair of grooving tools adjacent the cutting tool for cutting a pair of pipe grooves in the pipe;

FIG. 3 is a perspective view of the lock sleeve showing its slotted construction and a plurality of pipe groove tabs and coupling groove tabs;

FIG. 4 is a side elevational view partially in section showing the pipe grooves on the cut end of the pipe, the lock sleeve in position on the pipe and against a collar type stop and the pipe groove tabs in position in the pipe grooves;

FIG. 6 is a side elevational view partially in section showing the grooved end of the pipe, the lock sleeve secured in position on the pipe and provided with a stop flange, and the key sleeve in its rearward position adjacent the stop flange for depressing the coupling groove tabs on the lock sleeve preparatory for the insertion of the assembly into the coupling member;

FIG. 7 is a vertical sectional view of the coupling member positioned on the key sleeve and showing its central rib, the adjacent sealing washer and the coupling grooves;

FIG. 8 is a vertical side elevational view partially in section showing the grooved end of the pipe, the lock sleeve locked to the pipe grooves, the key sleeve in the coupling groove tab depressing position and the coupling member positioned on the end of the assembly;

FIG. 9 is a view similar to FIG. 8 showing the movement of the key sleeve a predetermined distance to release the coupling groove tabs on the lock sleeve preparatory to engagement with the coupling member adjacent the coupling grooves;

FIG. 10 is a view similar to FIGS. 8 and 9 showing the pressure or force applied to the pipe and the coupling member to compress the sealing washer a predetermined distance to permit the coupling groove tabs to slip into the coupling grooves on the coupling member thereby providing a hermetic seal between the coupling member and the pipe;

FIG. 11 is a view similar to FIG. 5 showing an alternative embodiment of the key sleeve and coupling member and in particular a slot and tab device for locking the lock sleeve to the key sleeve;

Figure 4A:
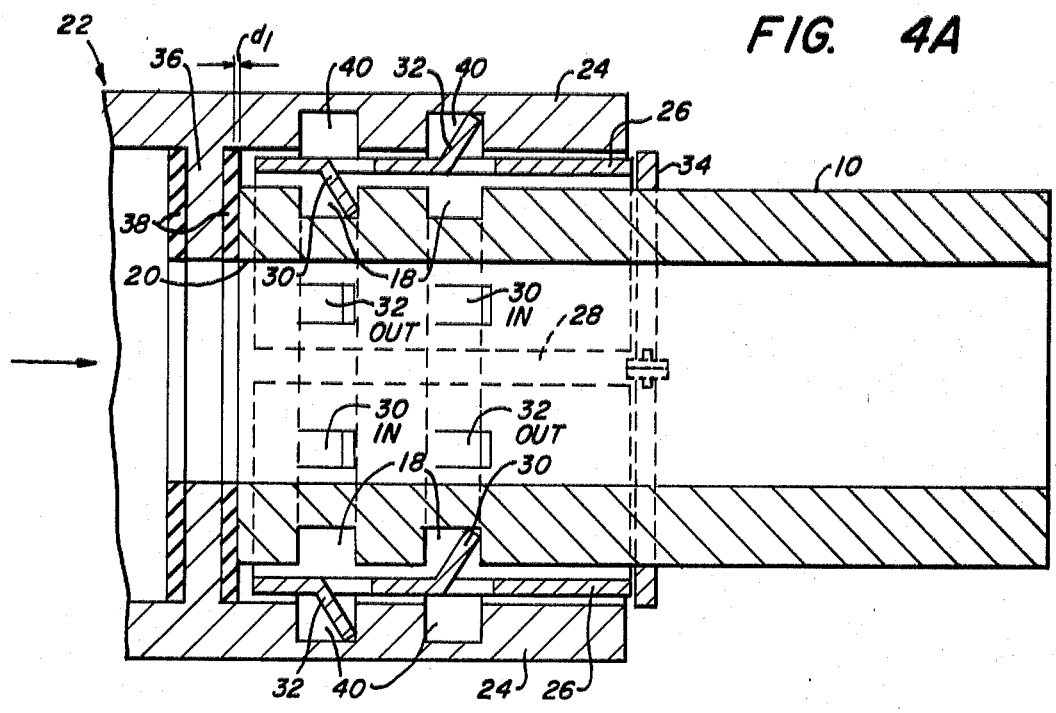
FIG. 4A is a view similar to FIG. 4 showing the coupling member in position on the lock sleeve with the coupling groove tabs locked in the coupling grooves.
Figure 5:
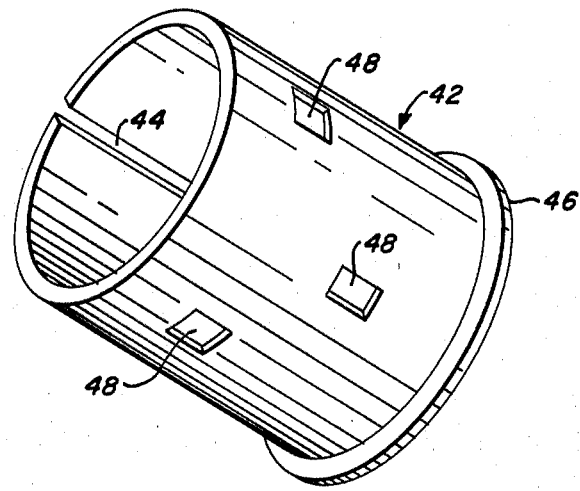
FIG. 5 is a perspective view of a key sleeve showing its slotted construction, its operating flange, and a plurality of key sleeve slots for the depression of and the insertion of coupling groove tabs therein.

Although the principles of this invention are broadly applicable to coupling devices in general, this invention is particularly adapted for use in conjunction with a coupling device for hermetically connecting one end of a pipe to a coupling member and hence it has been so illustrated and will be so described.

DETAILED DESCRIPTION

With specific reference to the form of the invention illustrated in the drawings and referring particularly to FIGS. 1 and 2, a pipe is indicated generally by the reference numeral 10 (FIGS. 1, 2, 4, 4A, 6, 7–10).

In FIGS. 1 and 2, the pipe 10 is secured in a conventional pipe cutting tool 12 (FIG. 1) having a cutting wheel 14 for cutting the pipe 10 (positioned against rollers 15, FIG. 1) to the predetermined length. In addition, the tool 12 is provided with grooved cutting tools 16 (FIGS. 1, 2) for cutting one or more, in this case, two, pipe grooves 18 (FIGS. 2, 4, 4A, 6–10) in the end 20 (FIGS. 4,4A,6,7,8,9,10,12) of the pipe 10.

A coupling device 22 (FIGS. 4A,6,7,8,9,10,12) of the present invention hermetically connects the end 20 of the pipe 10 to a coupling member 24 (FIGS. 4,4A,6–9 and 10).

COUPLING DEVICE 22

In addition, as shown in FIG. 3, the coupling device 22 has a lock sleeve 26 (FIGS. 3,4,4A,11), 26a (FIGS. 6,7,8,9,10) suitably formed of a metal such as steel or the like or a plastic, such as polyvinyl chloride, high density polyethylene, or the like, and provided with a longitudinal slot 28 (FIGS. 3,4,4A,6,7,89,10,11) and a plurality of pipe groove tabs 30 (FIGS. 3,4,4A,6,7,8,9,10) and coupling groove tabs 32 (FIGS. 3,4,4A,6,7,8,9,10).

In the embodiment of the invention shown in FIGS. 4,4A, the end 20 of the pipe 10 is provided with stop means, such as the collar 34 (FIGS. 4,4A) for the purpose of locating the lock sleeve 26 of the end 20 of the pipe 10. As shown in FIG. 4, the lock sleeve 26 is inserted on the end 20 of pipe 10 so that the pipe groove tabs 30 of the lock sleeve are locked in the pipe grooves 18 thereby securing the lock sleeve 26 on the end 20 of the pipe 10.

The coupling member 24 (FIGS. 4A and 7) is provided with a central rib portion 36 (FIGS. 4A,7–10,12), a sealing washer 38 (FIGS. 4A,7–10,12) disposed on either side of the rib portion 36 and a plurality, in this case 4, coupling grooves 40 (FIGS. 4A,7–10,12). As shown in FIG. 4A, the coupling member 24 is inserted on the lock sleeve 26 so that the coupling groove tabs 32 enter the coupling grooves 40 thereby locking the coupling member 24 to the lock sleeve 26. It will be understood by those skilled in the art that pressure must be applied to both the pipe 10 and the coupling member 24 to compress the sealing washers 38 a distance $d_1$ as shown in FIG. 4A before the coupling groove tab 32 on the lock sleeve 26 enters the coupling grooves 40 thereby providing a hermetic sealing between the coupling device 22 and the end 20 of the pipe 10.

ALTERNATIVE EMBODIMENTS

It will be understood by those skilled in the art that alternatively as shown in FIGS. 5–10, a key sleeve 42 (FIGS. 5,6–10) $42^{12}$ (FIG. 12) may be disposed between the lock sleeve 26 and one member of the coupling member 24 and the end 20 of the pipe 10. In this case shown in FIGS. 6–10, the key sleeve 42 is disposed between the lock sleeve 26 and a coupling member 24. As shown particularly in FIG. 5, the key sleeve 42 is provided with a longitudinal slot 44 (FIGS. 5,6–10), a hand gripping portion or flange 46 (FIGS. 5,6–10), $46^{12}$ (FIG. 12) and a plurality of tab slots 48 (FIGS. 5,6–10). The tab slots 48 control the position, in the embodiment shown in FIGS. 6–10, of the coupling groove tabs 32. As shown in FIG. 6, the key sleeve 42 is moved onto the lock sleeve 26 to depress the coupling groove tabs 32 when the key sleeve 42 is positioned adjacent the stop flange 34a on the lock sleeve 26a. Thereafter, the coupling member 24 is positioned on the key sleeve 42 in the position shown in FIGS. 7,8 where the end 20 of pipe 10 abuts against the sealing washer 38. The key sleeve 42 is then moved toward the end 20 of the pipe 10 a distance $d_2$ (FIG. 9) to permit the coupling groove tabs 32 to move through the tab slots 48 into engagement with a shoulder 50 adjacent slot 40 (FIGS. 7–10) of the coupling member 24 in the position shown in FIG. 9. As shown in FIG. 10, pressure simultaneously is applied to the pipe 10 and the coupling member 24 compresses the sealing washer 38 a distance $d_3$ (FIG. 10) to permit the coupling groove tabs 32 to move off the shoulder 50 and into the coupling grooves 40 of the coupling member 24, thereby hermetically sealing the end 20 of the pipe 10 to the coupling member 24.

In order to remove or disassemble the coupling device 22 the key sleeve 42 is moved toward the stop flange 34a, as viewed in FIG. 10, together with the simultaneous application of force to the pipe 10 and the coupling member 24 to move the coupling groove tabs 32 out of the coupling grooves 40 to the position shown in FIG. 8, thereby depressing the coupling groove tabs 32 to permit the facile removal of the coupling member 24 from the end 20 of the pipe 10.

FIG. 11 shows an alternative embodiment of the key sleeve $42^{11}$ disposed on a lock sleeve 26. The key sleeve $42^{11}$ is provided with a lock slot 52 (FIG. 11). The lock sleeve 26 is provided or has a locking tab 54 (FIG. 11) so that when the key sleeve $42^{11}$ is slid onto the lock sleeve 26, the locking tab 54 is engaged between the rearward end of the locking slot 52 in the key sleeve $42^{11}$ thereby limiting the movement of the key sleeve $42^{11}$ with respect to the lock sleeve 26.

Figure 12:
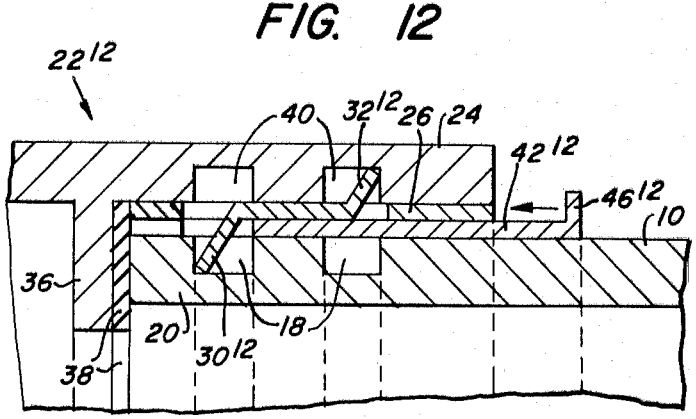
FIG. 12 is a fragmentary cross sectional view of an alternative embodiment of the coupling device and showing the key sleeve inserted between the lock sleeve and the pipe end and also eliminating the operating slot in the key sleeve.

In FIG. 12, the key sleeve $42^{12}$ is inserted between the lock sleeve 26 and the end 20 of pipe 10. In FIG. 12, the tab slot 48 in the key sleeve $42^{12}$ has been eliminated. In this embodiment in order to release the coupling device $22^{12}$, the key sleeve $42^{12}$ moves toward the end 20 of the pipe 10 in the direction of the arrow to raise the pipe groove tabs $30^{12}$ out of the pipe groove 18 thereby permitting removal of the coupling member 24 and the lock sleeve 26 from the end 20 of the pipe 10.

Figure 13:
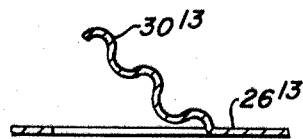
FIG. 13 is a fragmentary enlarged side elevational view of an alternative embodiment of either a coupling groove tab or a pipe groove tab and showing a generally corrugated configuration.
Figure 14:
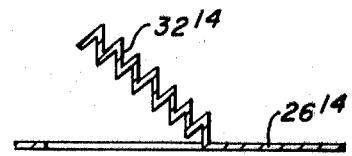
FIG. 14 is a view similar to FIG. 13 wherein the tab is serrated.
Figure 16:
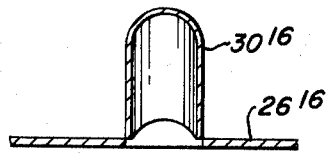
FIG. 16 is a fragmentary end elevational view of either a coupling groove tab or a pipe groove tab having a generally convex arcuate cross section.
Figure 15:
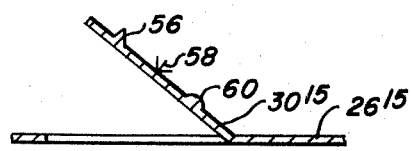
FIG. 15 is a view similar to FIGS. 13 and 14 showing protuberances on the tab.
Figure 17:
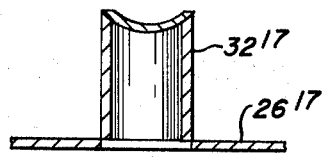
FIG. 17 is a view similar to FIG. 16 of a tab provided with a generally concave cross section.

FIG. 13 shows, for example, a pipe groove tab $30^{13}$ having a generally corrugated cross sectional shape. FIG. 14 shows, for example, a coupling groove tab $32^{14}$ of generally serrated cross section. In FIG. 15, the pipe groove tab $30^{15}$ is provided with a variety of protuberances, such as the point 56, the prongs 58 and dimples 60 or the like. In FIG. 16, a pipe groove tab $30^{16}$ has a generally convex arcuate cross section as distinguished from the straight cross section shown in the tabs of FIGS. 1–12 and the coupling groove tab $32^{17}$ shown in FIG. 17 has a generally concave arcuate cross section.

SUMMARY OF THE ACHIEVEMENTS OF THE OBJECTS OF THE INVENTION

It will be recognized by those skilled in the art that the objects of this invention have been achieved by providing an improved coupling device 22 (FIGS. 1–10) and $22^{12}$ (FIG. 12). The coupling device 22 and $22^{12}$ are simple and rugged in construction and are inexpensive. These coupling devices 22 and $22^{12}$ eliminate the conventional male connector by utilizing the end of the pipe 10 itself, provide a one-piece female connector; namely, the coupling member 24, provide a hermetic seal between the pipe end 20 and coupling member 24, eliminate conventional clutch jaws and retainer rings for holding the clutch jaws, are adapted to cover a wide range of pipe sizes, cannot accidentally cause disengagement of the coupling device by pushing thereon and use only one row of inwardly projecting tabs.

While in accordance with the patent statutes, preferred and alternative embodiments of this invention have been illustrated and described in detail, it is to be particularly understood that the invention is not limited thereto or thereby.

I claim:

1. A coupling device for one end of a pipe and having:
   a. said pipe being provided with a pipe groove adjacent said one end;
   b. a coupling member provided with a coupling groove;
   c. a lock sleeve having a pipe groove tab and a coupling groove tab;
   d. said lock sleeve being insertable into said coupling member so that said coupling groove tab locks in said coupling groove and disposable on said one end of said pipe so that said pipe groove tab locks in said pipe groove thereby securing said coupling member to said one end of said pipe; and
   e. one tab of said coupling groove tab and said pipe groove tab being corrugated.

2. A coupling device for one end of a pipe and having:
   a. said pipe being provided with a pipe groove adjacent said one end;
   b. a coupling member provided with a coupling groove;
   c. a lock sleeve having a pipe groove tab and a coupling groove tab;

d. said lock sleeve being insertable into said coupling member so that said coupling groove tab locks in said coupling groove and disposable on said one end of said pipe so that said pipe groove tab locks in said pipe groove thereby securing said coupling member to said one end of said pipe; and e. one tab of said coupling groove tab and said pipe groove tab being serrated.

3. A coupling device for one end of a pipe and having:

a. said pipe being provided with a pipe groove adjacent said one end;

b. a coupling member provided with a coupling groove;

c. a lock sleeve having a pipe groove tab and a coupling groove tab;

d. said lock sleeve being insertable into said coupling member so that said coupling groove tab locks in said coupling groove and disposable on said one end of said pipe so that said pipe groove tab locks in said pipe groove thereby securing said coupling member to said one end of said pipe; and e. one tab of said coupling groove tab and said pipe groove tab being arcuate in cross section.

4. A coupling device for one end of a pipe and having:

a. said pipe being provided with a pipe groove adjacent said one end;

b. a coupling member provided with a coupling groove;

c. a lock sleeve having a pipe groove tab and a coupling groove tab;

d. said lock sleeve being insertable into said coupling member so that said coupling groove tab locks in said coupling groove and disposable on said one end of said pipe so that said pipe groove tab locks in said pipe groove thereby securing said coupling member to said one end of said pipe; and e. one tab of said coupling groove tab and said pipe groove tab being provided with a protuberance.

5. A coupling device for one end of a pipe and having:

a. said pipe being provided with a pipe groove adjacent said one end of said pipe;

b. a coupling member provided with a coupling groove and having a central portion disposed inwardly of said coupling groove and a resilient sealing washer on said central portion;

c. a lock sleeve having a pipe groove tab and a coupling groove tab;

d. said lock sleeve being movable onto said one end of said pipe so that said pipe groove tab of said lock sleeve registers with and locks in said pipe groove on said one end of said pipe to lock said lock sleeve to said one end of said pipe;

e. a key sleeve provided with a tab slot for controlling the position of said coupling groove tab on said lock sleeve and movable onto said lock sleeve so that said tab slot in said key sleeve depresses said coupling groove tab on said lock sleeve;

f. said coupling member being movable onto said key sleeve so that said coupling groove in said coupling member is substantially in registry with said coupling groove tab of said lock sleeve, but said coupling groove tab of said lock sleeve does not enter said coupling groove in said coupling member;

g. said coupling member being further movable on said key sleeve relative to said one end of said pipe to compress said resilient sealing washer thereby permitting said coupling groove tab on said lock sleeve to pass through said tab slot in said key sleeve and to lock in said coupling groove in said coupling member and locking said key sleeve and said coupling member to said lock sleeve;

h. said key sleeve being therefore movable on said lock sleeve away from said one end of said pipe to move said coupling groove tab on said lock sleeve out of said coupling groove in said coupling member to permit relative removal movement between said one end of said pipe and said lock sleeve and said key sleeve and said coupling member.

6. The coupling device recited in claim 5 wherein said lock sleeve has stop means for limiting the movement of said key sleeve with respect to said lock sleeve.

7. The coupling device recited in claim 5 wherein said lock sleeve has a locking safety tab and said key sleeve is provided with a locking tab slot, said locking tab slot being operable to limit the movement of said key sleeve with respect to said lock sleeve.

8. The coupling device recited in claim 5 and having stop means disposed between said key sleeve and said lock sleeve.

9. The coupling device recited in claim 5 wherein one tab of said coupling groove tab and said pipe groove tab is straight in cross section.

10. The coupling device recited in claim 5 and having stop means on said pipe for limiting the movement of said lock sleeve with respect to said pipe.

11. The coupling device recited in claim 5 and having stop means on said pipe.

12. The coupling device recited in claim 5 and having stop means on said lock sleeve.

13. A coupling device for one end of a pipe and having:

a. said pipe being provided with a pipe groove adjacent said one end;

b. a coupling member provided with a coupling groove and having a central portion disposed inwardly of said coupling groove and a resilient sealing washer on said central portion;

c. a lock sleeve having a pipe groove tab and a coupling groove tab;

d. a key sleeve movable onto said one end of said pipe and provided with a tab slot for controlling the position of one of said lock sleeve tabs to clear said pipe groove in said one end of said pipe;

e. said lock sleeve being movable onto said key sleeve so that said pipe groove tab on said lock sleeve locks in said pipe groove in said one end of said pipe so that lock sleeve is locked to said one end of said pipe;

f. said coupling member being movable onto said lock sleeve so that said coupling groove in said coupling member is substantially in registry with said coupling groove tab on said lock sleeve but said coupling groove tab on said lock sleeve does not enter said coupling groove on said coupling member;

g. said coupling member being movable on said key sleeve relative to said one end of said pipe to compress said resilient sealing washer thereby permitting said coupling groove tab on said lock sleeve to move into and to lock in said coupling groove in said coupling member and thereby lock said lock sleeve to said coupling member;

h. said key sleeve being thereafter movable toward said one end of said pipe to move said pipe groove tab in said lock sleeve out of said pipe groove in said one end of said pipe to permit relative removal movement between said one end of said pipe and said key sleeve.

* * * * *